United States Patent
Krapf et al.

(10) Patent No.: US 9,891,340 B2
(45) Date of Patent: Feb. 13, 2018

(54) POSITIONING DEVICE FOR DETERMINING OBJECT DEPTH

(71) Applicant: Robert Bosch GmbH, Stuttgart (DE)

(72) Inventors: Reiner Krapf, Filderstadt (DE); Heiko Sgarz, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 386 days.

(21) Appl. No.: 14/432,860

(22) PCT Filed: Aug. 6, 2013

(86) PCT No.: PCT/EP2013/066496
§ 371 (c)(1),
(2) Date: Apr. 1, 2015

(87) PCT Pub. No.: WO2014/053265
PCT Pub. Date: Apr. 10, 2014

(65) Prior Publication Data
US 2015/0253450 A1 Sep. 10, 2015

(30) Foreign Application Priority Data
Oct. 5, 2012 (DE) .................. 10 2012 218 174

(51) Int. Cl.
*G01V 3/10* (2006.01)
*G01V 3/15* (2006.01)

(52) U.S. Cl.
CPC . *G01V 3/10* (2013.01); *G01V 3/15* (2013.01)

(58) Field of Classification Search
CPC .................................. G01V 3/10; G01V 3/15
See application file for complete search history.

(56) References Cited

U.S. PATENT DOCUMENTS

| | | | |
|---|---|---|---|
| 2010/0186504 A1 | 7/2010 | Cipriano et al. | |
| 2011/0202277 A1* | 8/2011 | Haddad | G01S 13/885 702/7 |
| 2013/0218008 A1* | 8/2013 | Itsuji | A61B 5/0073 600/425 |
| 2013/0245990 A1* | 9/2013 | Merewether | G01V 3/08 702/150 |

FOREIGN PATENT DOCUMENTS

| | | |
|---|---|---|
| CN | 101031823 A | 9/2007 |
| CN | 101051089 A | 10/2007 |

(Continued)

OTHER PUBLICATIONS

International Search Report corresponding to PCT Application No. PCT/EP2013/066496, dated Feb. 17, 2014 (German and English language document) (7 pages).

*Primary Examiner* — Bryan Bui
(74) *Attorney, Agent, or Firm* — Maginot, Moore & Beck LLP

(57) ABSTRACT

A positioning device for determining an object depth of a concealed positioning object includes a first positioning sensor, a second positioning sensor, and a computation unit. The computation unit can determine the object depth using at least a first positioning characteristic variable of the first positioning sensor. The computation unit can also correct the determined object depth in at least one operating state using a second positioning characteristic variable of the second positioning sensor.

6 Claims, 3 Drawing Sheets

(56) References Cited

FOREIGN PATENT DOCUMENTS

| | | |
|---|---|---|
| CN | 202133780 U | 2/2012 |
| DE | 195 18 973 A1 | 11/1996 |
| DE | 10 2004 007 315 A1 | 8/2005 |
| DE | 10 2008 054 460 A1 | 6/2010 |
| EP | 0 551 606 A2 | 7/1993 |
| EP | 1 298 457 A1 | 4/2003 |
| EP | 2 189 819 A1 | 5/2010 |
| JP | 5-264742 A | 10/1993 |
| JP | 11-148979 A | 6/1999 |
| JP | 2003-185758 A | 7/2003 |
| JP | 2004-69388 A | 3/2004 |
| JP | 2007-333577 A | 12/2007 |
| WO | 96/11414 A1 | 4/1996 |
| WO | 2005/109040 A1 | 11/2005 |
| WO | 2007/147199 A1 | 12/2007 |

* cited by examiner

POSITIONING DEVICE FOR DETERMINING OBJECT DEPTH

This application is a 35 U.S.C. §371 National Stage Application of PCT/EP2013/066496, filed on Aug. 6, 2013, which claims the benefit of priority to Serial No. DE 10 2012 218 174.1, filed on Oct. 5, 2012 in Germany, the disclosures of which are incorporated herein by reference in their entirety.

BACKGROUND

A positioning device for determining an object depth of a concealed positioning object, in particular of a reinforcing bar, comprising a first positioning sensor, at least one second positioning sensor and comprising a computation unit, which is provided for determining an object depth at least from a positioning characteristic variable of the first positioning sensor has already been proposed.

SUMMARY

The disclosure is based on a positioning device for determining an object depth of a concealed positioning object, in particular of a reinforcing bar, comprising a first positioning sensor, at least one second positioning sensor and comprising a computation unit, which is provided for determining an object depth at least from a positioning characteristic variable of the first positioning sensor.

It is proposed that the computation unit is provided for correcting the determined object depth in at least one operating state by means of a positioning characteristic variable of the second positioning sensor. An "object depth" should be understood to mean in particular an information item which is dependent at least on a distance between the positioning object and the positioning sensor. In particular, a positioning apparatus comprising the positioning device is provided for being placed by one side onto a measurement object enclosing the positioning object, in particular a wall. Preferably, the computation unit determines an object depth in the form of a distance between the positioning object and a plane spanned by locations of the positioning apparatus that bear on the measurement object. Advantageously, the object depth comprises at least one absolute value and particularly advantageously a tolerance that describes an accuracy of the absolute value of the object depth. In particular, a "concealed positioning object" should be understood to mean an object arranged in a manner hidden by the measurement object, in particular within and/or behind the measurement object. A "reinforcing bar" should be understood to mean, in particular, a metallic positioning object which, in a properly installed state, requires a predefined covering by the measurement object, in particular by concrete. In particular, the reinforcing bar comprises a ferromagnetic material. In particular, a "positioning sensor" should be understood to mean a unit provided for emitting an energy and receiving an energy reflected by the positioning object during positioning. The first positioning sensor and the second positioning sensor are embodied in each case as a sensor that appears expedient to the person skilled in the art, but preferably as a capacitive sensor, as an acoustic sensor, as a broadband or narrowband radar sensor, as an inductive sensor, as an impact echo sensor, SAR sensor and/or as an attachment NMR sensor. Advantageously, the first positioning sensor and the second positioning sensor have different functional principles. Advantageously, the positioning device comprises, besides the first positioning sensor and the second positioning sensor, a third positioning sensor and particularly advantageously at least one fourth positioning sensor. In particular, the third positioning sensor and/or the fourth positioning sensor perform(s) positioning according to a positioning principle identical to that of the second positioning sensor. A "computation unit" should be understood to mean, in particular, a unit having an information input, information processing and an information output. Advantageously, the computation unit comprises at least one processor, a memory, input and output means, further electrical components, an operating program, regulating routines, control routines and/or calculation routines. Preferably, the components of the computation unit are arranged on a common circuit board and/or advantageously arranged in a common housing. "Provided" should be understood to mean, in particular, specifically programmed, designed and/or equipped. In particular, a "positioning characteristic variable" should be understood to mean an energy provided for transporting an information item having the object depth from the positioning sensor to the computation unit. Preferably, the positioning characteristic variable is embodied as an electrical analog and/or digital signal. The term "correct" should be understood to mean, in particular, that the computation unit determines the object depth from the positioning characteristic variable of the first positioning sensor, checks the object depth by means of the positioning characteristic variable of the second positioning sensor and, if the object depth is identified as incorrect, outputs an information item which is advantageously dependent on the previously ascertained object depth and/or a changed tolerance of the determined object depth. The configuration of the positioning device according to the disclosure enables, in a structurally simple manner, a very accurate depth positioning in which positioning inaccuracies can be reliably identified. Positioning inaccuracies occur, in particular, if positioning objects have unexpected dimensions and/or shapes or if a plurality of positioning objects are arranged in a small space, in particular one behind another. In this case, the second positioning sensor can be constructed in a particularly simple manner. In particular, the second positioning sensor need not exhibit long-term drift stability.

In a further configuration it is proposed that the first positioning sensor is provided for inductively positioning the positioning object, as a result of which a particularly accurate positioning, in particular of metallic and in particular ferromagnetic positioning objects, is possible in a structurally simple manner. In particular, "inductively positioning" should be understood to mean that the positioning sensor establishes a magnetic field and detects an alteration of the magnetic field and/or a reflection of part of the magnetic field by the positioning object. Preferably, the positioning sensor comprises a coil which establishes the magnetic field during a positioning process. Preferably, the positioning sensor and in particular the computation unit are provided for ascertaining the object depth by means of a determination of a field induced into the positioning object by the coil by means of a second coil. Particularly preferably, the positioning sensor and in particular the computation unit are provided for ascertaining the object depth by means of a detection of eddy currents induced into the positioning object by a pulse. Preferably, the computation unit is provided for calibrating the positioning sensor, in particular in a manner dependent on properties of the measurement object, by determining a behavior of the positioning sensor during positioning in which no positioning object is detected. Preferably, the first positioning sensor performs positioning during locating of a measurement object continually, that is to say in particular more than twice per second, advantageously more than five times per second.

It is furthermore proposed that the second positioning sensor is provided for positioning the positioning object at least substantially independently of a positioning mass of the positioning object, as a result of which particularly reliable checking of an object depth determined by means of an in particular capacitive and/or inductive positioning sensor is possible. Alternatively, the second positioning sensor could likewise be embodied as an inductive sensor which performs positioning by means of a different positioning method than the positioning method of the first positioning sensor. Preferably, the positioning method of the second positioning sensor has a different dependence on a positioning mass of a positioning object compared with the positioning method of the first positioning sensor. Advantageously, one of the positioning sensors, preferably the first positioning sensor, is provided for generating a magnetic dipole field. Preferably, one of the positioning sensors, preferably the second positioning sensor, is provided for generating a magnetic quadrupole field. In particular, the first positioning sensor and the second positioning sensor are embodied at least partly integrally. Preferably, the second positioning sensor performs positioning continually during locating of a measurement object. A "positioning mass" should be understood to mean, in particular, part of a mass of the positioning object which substantially influences the positioning signal of the first positioning sensor during a respective positioning. In particular, "at least substantially independently" should be understood to mean that the object depth determined by means of the second positioning sensor in at least one operating state is influenced by the positioning mass of the positioning object to the extent of less than 20%, advantageously to the extent of less than 10%, particularly advantageously to the extent of less than 5%. In a further configuration, the second positioning sensor is provided for detecting further items of information about the positioning object that appear to be expedient to the person skilled in the art, such as, in particular, items of information about a type, a position parallel to a surface of the measurement object, an orientation, a diameter, a size, a form of the positioning object and/or a distance between the positioning object and other positioning objects or elements that influence the positioning. Preferably, the computation unit is provided for identifying an in particular systematic error of the first positioning sensor by means of the second positioning sensor, and in particular correcting said error, for example on account of a second metallic and in particular ferromagnetic object behind the measurement object.

It is furthermore proposed that the computation unit is provided for determining the object depth by means of at least one object mass information item which describes a positioning mass of the positioning object, as a result of which a particularly accurate determination of the object depth can be achieved, in particular by means of an inductive positioning sensor. In particular, the first positioning sensor can achieve an accuracy of less than ±1 mm given a correct object mass information item. An "object mass information item" should be understood to mean, in particular, an information item which describes a value of an object mass of an expected measurement object, in particular of an installed reinforcing bar. Preferably, the object mass information item is dependent on a diameter of a reinforcing bar. In particular, "describe" in this context should be understood to mean that the positioning mass in particular given a known form of the positioning object can be derived from the object mass information item.

In addition, it is proposed that the object mass information item is settable by an operator, as a result of which, given a known positioning object, very accurate positioning is possible. In particular, the expression "settable by an operator" should be understood to mean that the computation unit is provided for at least storing an object mass information item set by means of an operating element of the positioning device. Preferably, by means of the operating element, a form and/or at least one dimension of a measurement object that appears to be expedient to the person skilled in the art are/is settable, but particularly preferably a diameter of a reinforcing bar. Preferably, the computation unit is provided for compensating for at least one systematic measurement error of the second positioning sensor by an object depth determined by means of the object mass information item. By way of example, it is possible to determine such a measurement error resulting from an unknown propagation speed in the measurement object.

It is furthermore proposed that the computation unit is provided for determining the object mass information item from the positioning characteristic variables at least of the first positioning sensor and of the second positioning sensor, as a result of which said information item can be ascertained particularly conveniently. In this context, the term "determine" should be understood to mean, in particular, that the computation unit calculates the object mass information item from the positioning characteristic variable of the positioning sensors.

In one advantageous embodiment of the disclosure, it is proposed that the computation unit is provided for indicating to the operator if the determined object mass information item deviates from the object mass information item set by the operator, as a result of which positioning of a measurement object with an unforeseen object mass can be identified particularly simply by the operator. In particular, "indicate" should be understood to mean that the computation unit is provided for outputting to the operator via a corresponding means an optical, acoustic and/or haptic signal to which is assigned the information that the determined object mass information item deviates from the object mass information item set by the operator. Particularly advantageously, the computation unit is provided for indicating a deviation of the determined object mass information item from the set object mass information item. In this context, "deviate" should be understood to mean, in particular, that the determined object mass information item differs from the set object mass information item by more than 50%, advantageously by more than 25%, particularly advantageously by more than 10%.

Furthermore, it is proposed that the computation unit is provided for determining the at least one desired object mass information item from the determined object mass information items of a plurality of positioning objects. A "desired object mass information item" should be understood to mean, in particular, an information item which describes what kind of object mass is expected in the case of a measurement object having a plurality of positioning objects. In particular, the computation unit is provided for averaging the desired object mass information item from ascertained object mass information items of a plurality of positioning objects in particular having similar object masses. Preferably, the computation unit is provided for averaging the desired object mass information item in a manner dependent on a statistical distribution of a plurality of ascertained object mass information items of a plurality of positioning objects. By way of example, the computation unit could ascertain that principally reinforcing bars having a specific diameter have been positioned. The computation unit is provided for determining a particularly accurate desired object mass information item by averaging the determined object masses of the positioning objects.

Moreover, it is proposed that the computation unit is provided for determining at least one desired object depth information item from object depth information items of a plurality of positioning objects, as a result of which particularly convenient checking of a measurement object with regard to measurement objects arranged at different depths can be achieved. A "desired object depth information item" should be understood to mean, in particular, an information item which describes what kind of object depth is expected in the case of a positioning object having a plurality of positioning objects. In particular, the computation unit is provided for storing at least in each case one object depth information item of a plurality of positioning objects. Alternatively or additionally, a desired object depth information item could be settable by an operator. Preferably, the computation unit is provided for signaling a significant deviation of a determined object depth of a positioning object from the desired object depth information item, particularly if the positioning object is arranged more shallowly than is predefined by the desired object depth information item.

Furthermore, it is proposed that the positioning device comprises a motion sensor provided for detecting a motion at least of the positioning sensors relative to a measurement object, as a result of which particularly accurate positioning and an advantageous representation of the positioning results are possible. Alternatively or additionally, the second positioning sensor could be provided for detecting at least one location information item of the positioning object on a plane perpendicular to a positioning direction of the first positioning sensor, as a result of which it is possible to identify and in particular compensate for metallic and in particular ferromagnetic objects which run parallel to an envisaged direction of motion and influence a positioning result. A "motion sensor" should be understood to mean a sensor which appears to be expedient to the person skilled in the art, but advantageously an optical sensor, an acceleration sensor and/or particularly advantageously a sensor that picks up a motion of rollers provided for rolling on the measurement object during positioning. Preferably, the computation unit is provided for compensating for an influence of an 'in particular previously positioned' object which is adjacent to a positioning object and which influences the positioning result. By way of example, a mesh width of a reinforcing mat could be input by an operator and resultant influencing of the positioning results of, in particular, the first positioning sensor could be compensated for. Preferably, the positioning sensors are arranged alongside one another in the envisaged direction of motion. The positioning results of the positioning sensors are correlated by way of the motion of the positioning sensor relative to a measurement object. Alternatively, the positioning results of the positioning sensors could be correlated by way of an ascertained time and/or by way of an ascertained and stored maximum of the positioning characteristic variables. Alternatively or additionally, the computation unit could be provided for correlating the calculated object depths of the positioning sensors with one another. Furthermore, the positioning sensors could alternatively or additionally be arranged, relative to the envisaged direction of motion, perpendicularly alongside one another, obliquely alongside one another and/or congruently. Preferably, the computation unit is provided for storing a profile of the positioning characteristic variable and/or of the object depth in particular against a time and/or advantageously against a motion. Preferably, the computation unit is provided for outputting a profile of the positioning characteristic variable and/or of the object depth to the operator. Advantageously, the computation unit is provided for forecasting in advance a profile of the positioning characteristic variable against the time and/or advantageously against the motion, in particular from a correlation with one another. As a result, an influence of a positioning object on a positioning result of a next positioning object can be extracted computationally.

In this case, the positioning device according to the disclosure is not intended to be restricted to the application and embodiment described above. In particular, the positioning device according to the disclosure can have a number of individual elements, components and units that deviates from a number mentioned herein, in order to fulfill a functioning described herein.

BRIEF DESCRIPTION OF THE DRAWINGS

Further advantages will become apparent from the following description of the drawing. The drawing illustrates one exemplary embodiment of the disclosure. The drawing, the description and the claims contain numerous features in combination. The person skilled in the art will expediently also consider the features individually and combine them to form practical further combinations.

In the figures.

DETAILED DESCRIPTION

Figure 1:
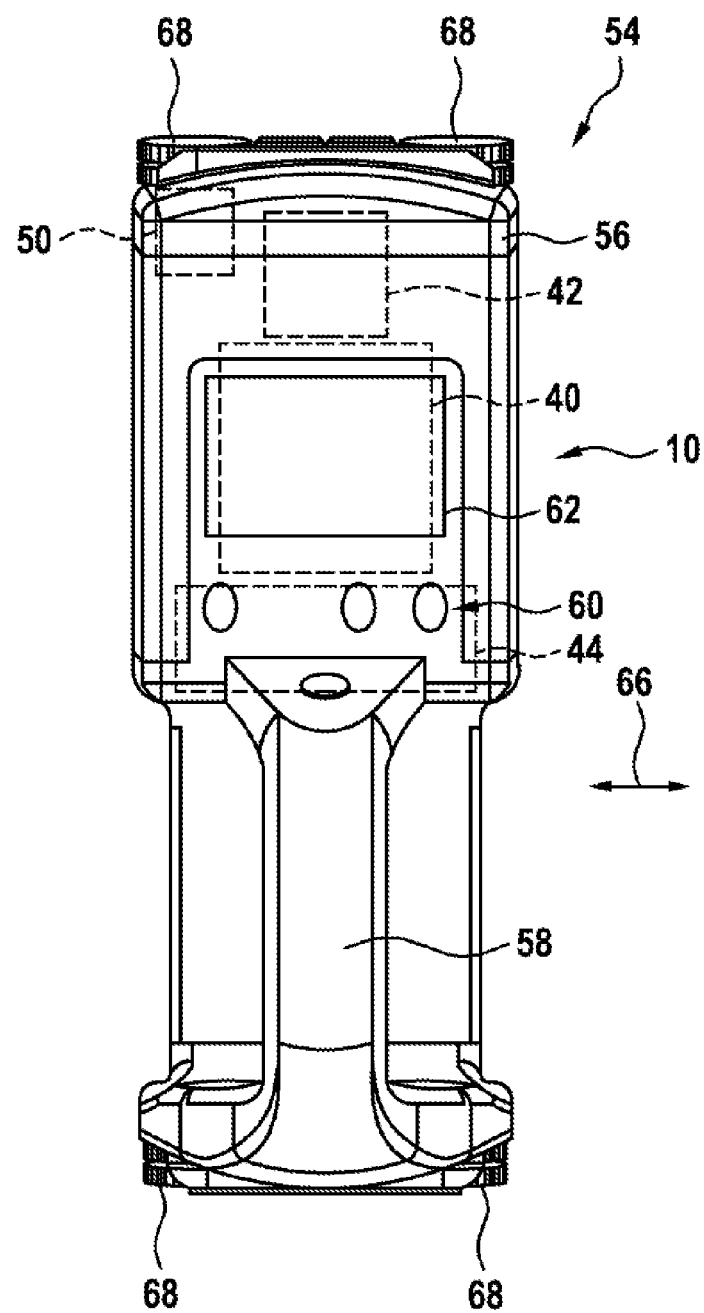
FIG. 1 shows a handheld positioning apparatus according to the disclosure comprising a schematically illustrated positioning device having two positioning sensors.

FIG. 1 shows a handheld positioning apparatus 54 comprising a positioning device 10 according to the disclosure, an apparatus housing 56 with a handle 58, operating elements 60 and an output means 62. The output means 62 is embodied as a display. The positioning device 10 is substantially arranged in an interior of the apparatus housing 56. The positioning device 10 is provided for performing positioning in a positioning direction 64 running through a rear side of the apparatus housing 56. The operating elements 60 and the output means 62 are arranged on a front side of the apparatus housing 56.

The positioning device 10 is provided for determining an object depth 12, 14, 16 of a concealed positioning object 18-38, here reinforcing bar. For this purpose, the positioning device 10 comprises a first positioning sensor 40, a second positioning sensor 42 and a computation unit 44. The first positioning sensor 40 and the second positioning sensor 42 in each case comprise electronics (not illustrated in more specific detail) provided for generating a positioning signal and for conditioning a received reflection of the positioning signal at the positioning objects 18-38 for evaluation by the computation unit 44.

The first positioning sensor 40 is embodied as an inductive positioning sensor. The first positioning sensor 40 comprises a coil (not illustrated in more specific detail), which transmits a substantially magnetic positioning signal into a measurement object 52 during positioning. The coil receives a portion of the positioning signal reflected from the positioning objects 18-38. The reflected portion of the positioning signal arises as a result of eddy currents induced into a positioning object 18-38. The first positioning sensor 40 outputs a first positioning characteristic variable 46 to the computation unit 44. The computation unit 44 evaluates at least one amplitude of the reflected portion of the positioning signal.

The second positioning sensor 42 is embodied as a radar sensor. The second positioning sensor 42 comprises an antenna (not illustrated in more specific detail), which transmits a substantially radio-frequency electromagnetic positioning signal into the measurement object 52 during positioning. The antenna receives a portion of the positioning signal reflected from the positioning objects 18-38. The second positioning sensor 42 outputs a second positioning characteristic variable 48 to the computation unit 44. Consequently, the second positioning sensor 42 is provided for performing positioning of positioning objects 18-38 at least substantially independently of a positioning mass of the positioning objects 18-38. The second positioning sensor 42 is arranged on a plane perpendicular to an envisaged direction 66 of motion alongside the first positioning sensor 40.

The positioning device 10 comprises a motion sensor 50, which is provided for detecting a motion of the positioning sensors 40, 42 relative to the measurement object 52. The motion sensor 50 detects the motion of one of four rolling bodies 68 provided for rolling on the measurement object 52 when the handheld positioning apparatus 54 is moved in the envisaged direction 66 of motion over the measurement object 52. In addition, the motion sensor 50 could detect the motion of further rolling bodies 68.

The computation unit 44 determines object depths 12, 14, 16 of the positioning objects 18-38 from the positioning characteristic variable 46 of the first positioning sensor 40 in order during positioning. In this case, the computation unit 44 corrects an absolute value of the object depths 12, 14, 16 that is output to the operator and/or a tolerance of the object depths 12, 14, 16 that is output to the operator, by means of the positioning characteristic variable 48 of the second positioning sensor 42. The computation unit 44 is provided for calculating, in different positioning modes, information items of the positioning objects 18-38 in various ways that appear to be expedient to the person skilled in the art, and for outputting them to the operator. The positioning modes can be switched and/or configured by an operator by means of the operating elements 60.

Figure 2:
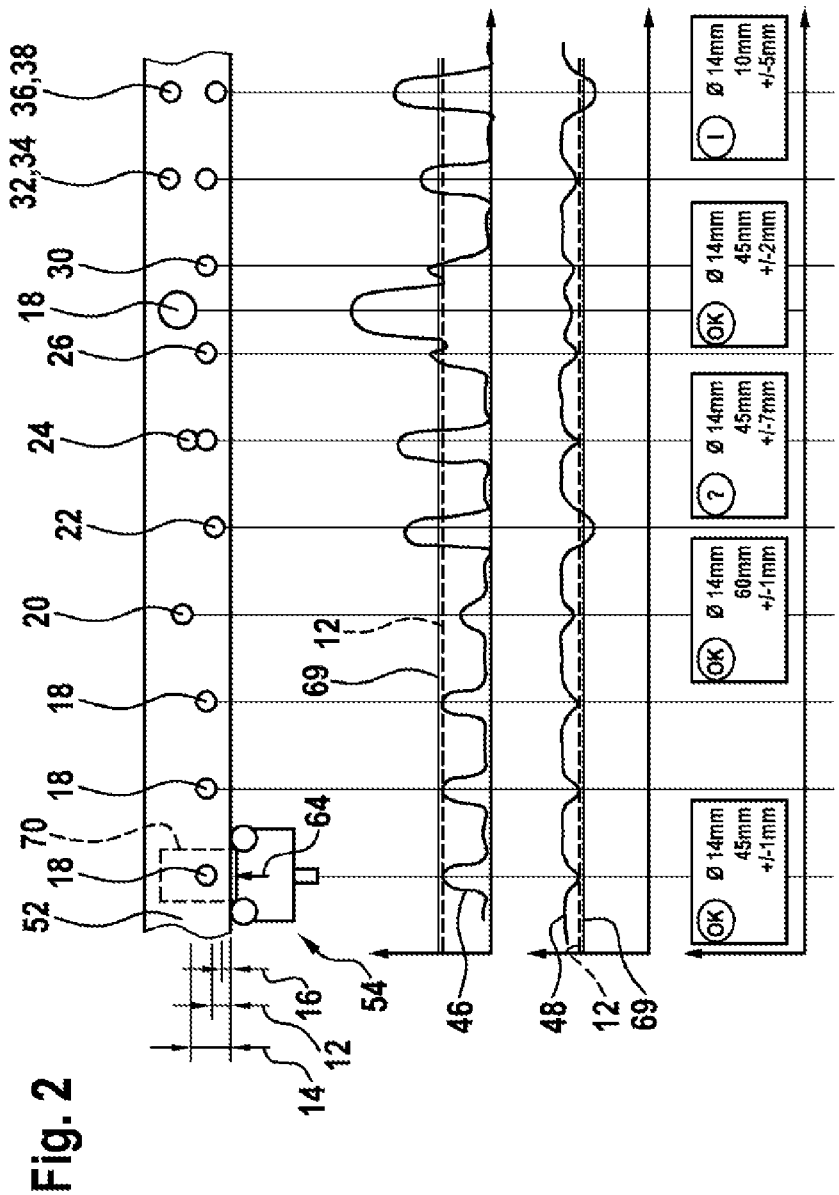
FIG. 2 shows the handheld positioning apparatus from FIG. 1, a measurement object having a plurality of positioning objects, and also profiles of positioning characteristic variables of the positioning sensors and part of an indication of the object depth.

FIG. 2 shows the measurement object 52 having a plurality of positioning objects 18-38, the handheld positioning apparatus 54, an absolute value of the first positioning characteristic variable 46, an absolute value of the second positioning characteristic variable 48, exemplary indications of the output means 62 for four positioning instances, with a value of the provided object depth 12, and a threshold value 69 in relation to the value of the positioning characteristic variables 46, 48. If an object depth 16 falls below the threshold value 69, there is insufficient covering of the positioning objects 22, 36. The threshold value here is 40 mm. The positioning objects 18 are partly arranged at a provided object depth 12 and have an expected object mass. The provided object depth 12 is a value at which the positioning objects 18 are intended to be installed. The provided object depth 12 generally occurs the most frequently in a statistical evaluation of the detected object depth 12. In this exemplary embodiment, the threshold value 69 is slightly less than the provided object depth 12. The provided object depth here is 45 mm. The measurement object 52 is embodied as a wall formed from reinforced concrete. The positioning objects 18-38 are embodied as various reinforcing bars arranged within the wall.

The three first positioning objects 18 are arranged at a provided object depth 12. The second positioning object 20 is arranged at the second object depth 14, which is deeper than a provided object depth 12 and the threshold value 69. The third positioning object 22 is arranged at a third object depth 16, which is shallower than a provided object depth 12. Consequently, the third positioning object 22 is not sufficiently covered by concrete, as a result of which the reinforcing bar can oxidize. The fourth positioning object 24 has an object mass greater than an expected object mass. The fifth positioning object 26, the sixth positioning object 28 and the seventh positioning object 30 are arranged so close to one another that the positioning results influence one another. Moreover, the sixth positioning object 28 has an object mass greater than an expected object mass. The eighth positioning object 32 and the ninth positioning object 34 are arranged one behind the other, wherein the eighth positioning object 32 is arranged at the first object depth 12. The tenth positioning object 36 and the eleventh positioning object 38 are likewise arranged one behind the other, wherein the ninth positioning object 36 is arranged at the third object depth 14, which is shallower than a provided object depth 12. The positioning objects 18-38 have a diameter of 14 mm apart from the sixth positioning object 28, wherein the fourth positioning object 24 is embodied as a double rod.

The operator sets an object mass information item expected by the operator, here a diameter of the reinforcing bars of 14 mm, by means of the operating elements 60 on the handheld positioning apparatus 54. In this exemplary embodiment, the operator sets a diameter of the reinforcing bars. The computation unit 44 stores the expected object mass information item. The operator moves the handheld positioning apparatus 54 in the direction 66 of motion over the measurement object 52. The first positioning sensor 40 and the second positioning sensor 42 in each case detect the first positioning object 18 as soon as one of the first positioning objects 18 is arranged in a positioning range 70 of the positioning sensors 40, 42. The computation unit 44 determines a first absolute value information item of the object depth 12 by means of the object mass information item and the first positioning characteristic variable 46. In addition, the computation unit 44 during positioning between the positioning objects 18-38 identifies from the second positioning characteristic variable 48 if no positioning object is arranged in the positioning range 70, and then determines an empty deduction of the first positioning characteristic variable 46, which it deducts from the first positioning characteristic variable 46 during further positioning instances.

In addition, the computation unit 44 determines a second absolute value information item of the object depth 12 from the second positioning characteristic variable 48. The computation unit 44 correlates the first absolute value information item and the second absolute value information item with one another, such that a positioning of the first positioning sensor 40 can be assigned to a positioning of the second positioning sensor 42. If the first absolute value information item and the second absolute value information item are consistent, the computation unit 44 outputs an absolute value of the object depth 12 to the operator (cf. FIG. 2). In addition, the computation unit 44 indicates to the operator that the ascertained absolute value has a small tolerance, for example ±1 mm. In addition, the computation unit 44 calibrates a determination of the second absolute value information item from the second positioning characteristic variable 48 by means of the object depth 12 ascertained by means of the first positioning characteristic variable 46. For this purpose, the computation unit 44 determines a dielectric constant of the measurement object 52.

The computation unit 44 is provided to the effect that the operator inputs, by means of the operating elements 60, the threshold value 69 below which insufficient covering of the reinforcing bars is present. If a determined absolute value information item of the object depth 12 is shallower than the threshold value 69, the computation unit 44 outputs an in particular optical and/or acoustic alarm to the operator. If a tolerance of the object depth 12 is in part shallower than the threshold value 69, the computation unit 44 outputs a warning indication to the operator. FIG. 2 illustrates said threshold value 69 in a relationship with the positioning characteristic variables 46, 48. As can be seen, by means of the positioning characteristic variable 46 of the first positioning sensor 40 it is not possible to reliably identify whether a positioning object 36 has insufficient covering or whether a positioning object 24, 28, 32, 34 has a positioning mass greater than expected.

In the course of locating the measurement object 52, the operator moves along the measurement object 52. In this case, the computation unit 44 stores a profile of the first absolute value information item and the second absolute value information item. Upon each consistent determination of an absolute value of the object depth 12, 14, 16 of one of the positioning objects 18-22, the computation unit 44 calibrates a determination of the second absolute value information item from the second positioning characteristic variable 48.

During the locating of the fourth to tenth positioning objects 24-38, a first absolute value information item and a second absolute value information item are inconsistent because object mass information items expected and set by the operator deviate from an actual positioning mass. The computation unit 44 indicates to the operator an absolute value of the object depth 12, 14, 16 ascertained from the second positioning characteristic variable 48. In addition, the computation unit 44 indicates to the operator that an absolute value ascertained from the second positioning characteristic variable 48 has a greater tolerance, for example ±1 mm. In this case, a value of the tolerance is dependent on an accuracy of the calibration during the determination of the second absolute value information item. By way of example, the tolerance, if a consistent determination of an absolute value was not possible in the case of a measurement object 52, is up to ±10 mm. In addition, the computation unit 44 indicates to the operator if a determined value of the positioning mass deviates from the set positioning mass.

The computation unit 44 is provided for determining an object mass information item from the positioning characteristic variables 46, 48 at least of the first positioning sensor 40 and of the second positioning sensor 42. In addition, the computation unit 44 determines a tolerance of the determined object mass information item. The computation unit 44 indicates to the operator if the determined object mass information item deviates from the object mass information item set by the operator, here with a ≠ symbol. In addition, the computation unit 44 could indicate the determined object masses and in particular a tolerance of the determined object mass information item.

Furthermore, a desired object depth information item is settable by means of the operating elements 60. The computation unit 44 is provided for storing the set desired object depth information item. The computation unit 44 is provided for comparing the set desired object depth information item with an ascertained absolute value of an object depth 12, 14, 16. If the set desired object depth information item deviates from an ascertained absolute value of an object depth 12, 14, 16, for example by more than a settable, in particular direction-dependent value, the computation unit 44 indicates a warning to the operator. Alternatively or additionally, the computation unit 44 could output an acoustic and/or tactile warning. The computation unit 44 signals to the operator if insufficient covering is present, here with an exclamation mark illustrated. Furthermore, the computation unit 44 signals to the operator if insufficient covering might be present on account of the determined tolerances, here with a question mark illustrated.

The computation unit 44 is provided for determining a desired object depth information item and/or a desired object mass information item by a statistical evaluation of the results of the determination of the object depths 12, 14, 16 from the determined object mass information items and/or from determined object depth information items of a plurality of positioning objects 18. For this purpose, the computation unit 44 evaluates a statistical distribution of the determined object mass information items and/or object depth information items.

The various functions described above are in each case configurable and deactivatable by means of the computation unit 44 in a manner that appears to be expedient to the person skilled in the art.

Figure 3:
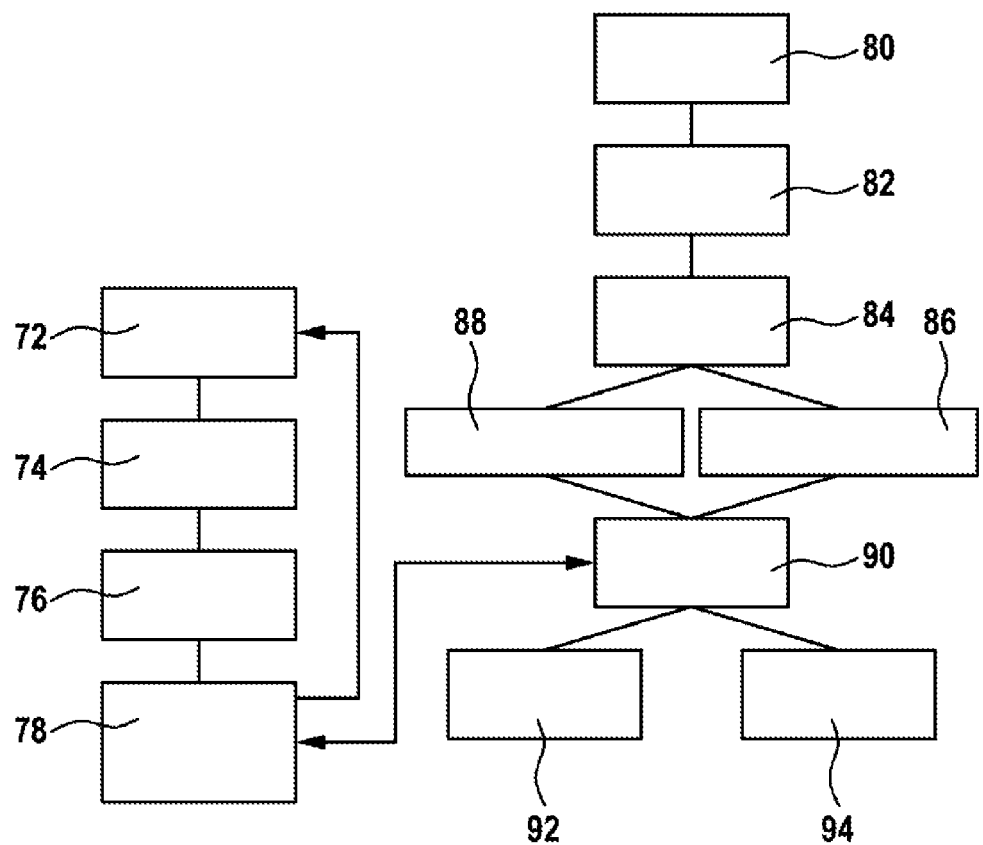
FIG. 3 shows a method for determining an object depth of a concealed positioning object using the positioning device from FIG. 1.

FIG. 3 shows a sequence of part of a method according to the disclosure for determining the object depth 12, 14, 16 of the concealed positioning object 18-38. In a method step 72, the first positioning sensor 40 detects the positioning object 18. In a next method step 74, the second positioning sensor 42 detects the positioning object 18. In a subsequent method step 76, the computation unit 44 determines an absolute value information item of the object depth 16 of the positioning object 18 from the positioning characteristic variable 48 of the second positioning sensor 42. Said absolute value information item has a relatively large tolerance which can be indicated to the operator.

In a further method step 78, the computation unit 44 determines the object mass information item expected for a next positioning object 18-38 from the absolute value information item of the object depth 16 determined by means of the second positioning sensor 42 and the detected positioning characteristic variable 46 of the first positioning sensor 40. This information is output by the computation unit 44 by means of the output means 62 to the operator for monitoring for plausibility. This procedure is repeated if the operator moves the handheld positioning apparatus 54 over further positioning objects 18-38; in this case, the expected object mass information item is determined more accurately by averaging, wherein only determined object mass information items are averaged which deviate from a median of the object mass information items by a specific value, or alternatively according to some other method that appears to be expedient to the person skilled in the art. The tolerance of the absolute value information item becomes smaller as a result of the averaging, which is indicated to the operator. Alternatively or additionally, the operator could set the object mass information item by means of the operating elements 60, if it is known to said operator. Particularly if the expected object mass information item can only assume specific values, for example reinforcing bars have specific diameters, the operator and/or the computation unit 44 can correct the object mass information item to such a value.

In the course of movement of the handheld positioning apparatus 54, the first positioning sensor 40 detects a further positioning object 18-38 in a further method step 80. In a next method step 82, the computation unit 44 determines an object depth 12, 14, 16 by means of the determined and/or input object mass information item and the positioning characteristic variable 46 of the first positioning sensor 40. In a further method step 84, the second positioning sensor 42 detects the positioning object 18-38. In a next method step 86, the computation unit 44 determines a further object depth 12, 14, 16 from the positioning characteristic variable 46 of the second positioning sensor 42.

If the positioning sensors 40, 42 are arranged at a distance from one another in the direction 66 of motion, in a method step 88 the computation unit 44 determines by means of a correlation which detected and stored object depths 12, 14, 16 and/or positioning characteristic variables 46, 48 are associated with one another.

In a method step 90, the computation unit 44 checks, in particular taking account of the tolerances ascertained for the two object depths 12, 14, 16, whether the object depths 12, 14, 16 determined by means of the first positioning sensor 40 and thus the ascertained and/or input object mass information items are correct. For this purpose, the computation unit 44 determines a quotient of the absolute value information items of the object depths 12, 14, 16 determined by means of the first positioning sensor 40 and the second positioning sensor 42. If the object depths 12, 14, 16 determined by means of the first positioning sensor 40 are in each case within the tolerance of the object depths 12, 14, 16 determined by means of the second positioning sensor 42, in a method step 92 the computation unit 44 outputs an absolute value information item of the object depth 12, 14, 16 determined by means of the first positioning sensor 40 and the previously ascertained tolerance of the object depths 12, 14, 16 determined by means of the first positioning sensor 40. If the object depth 12, 14, 16 determined by means of the first positioning sensor 40 lies outside the tolerance of the object depth 12, 14, 16 determined by means of the second positioning sensor 42, in a method step 94 the computation unit 44 outputs an absolute value information item of the object depth 12, 14, 16 determined by means of the second positioning sensor 42 and the previously ascertained tolerance of the object depth 12, 14, 16 determined by means of the second positioning sensor 42.

Alternatively or additionally, when an absolute value of an object depth 12, 14, 16 is output, the operator could indicate to the operator that the absolute value of the object depth 12, 14, 16 was determined by means of the second positioning sensor 42, such as, for example, by a different color, a symbol, in particular an exclamation mark, a sound, a light signal, a different test representation and/or a different arrangement of the indication. Furthermore, the computation unit 44 could simultaneously output an absolute value of the object depth 12, 14, 16 that was determined by means of the first positioning sensor 40 and an absolute value of the object depth 12, 14, 16 that was determined by means of the second positioning sensor 42.

The invention claimed is:

1. A positioning device for determining a depth of an object comprising:
   a magnetic sensor configured to generate a magnetic field in a region around the object;
   a radar sensor configured to emit radio waves that are reflected from the object;
   a computation unit operatively connected to the magnetic sensor and the radar sensor, the computation unit being configured to:
   identify a first depth measurement of the object based on a change in the magnetic field produced by the object detected by the magnetic sensor;
   identify a second depth measurement of the object based on reflected radio waves from the object detected by the radar sensor;
   generate a first output indicating the depth of the object in response to a difference between the first depth measurement and the second depth measurement being less than a predetermined threshold; and
   generate a second output indicating the depth of the object based on the second depth measurement and a tolerance range indicating measurement error in response to a difference between the first depth measurement and the second depth measurement being greater than the predetermined threshold.

2. The positioning device of claim 1 further comprising:
   an output device configured to generate at least one of an optical, acoustic, or haptic alarm; and
   the computation unit operatively connected to the output device and further configured to:
   generate an alarm output in response to the first depth measurement and the second depth measurement being within the predetermined threshold and the first depth measurement and the second depth measurement both indicating that the depth of the object is less than a predetermined threshold.

3. The positioning device of claim 1, the computation unit being further configured to:
   identify the first depth measurement of the object based on the change in the magnetic field produced by the object detected by the magnetic sensor only in response to the change in the magnetic field indicating that the object has a diameter that is within a predetermined detection range.

4. A method for determining a depth of an object comprising:
   generating, with a magnetic sensor, a magnetic field in a region around the object;
   generating, with a radar sensor, radio waves that are reflected from the object;
   identifying, with a computation unit, a first depth measurement of the object based on a change in the magnetic field produced by the object detected by the magnetic sensor;
   identifying, with the computation unit, a second depth measurement of the object based on reflected radio waves from the object detected by the radar sensor; and
   generating, with the computation unit, a first output indicating the depth of the object in response to a difference between the first depth measurement and the second depth measurement being less than a predetermined threshold; and
   generating, with the computation unit, a second output indicating the depth of the object based on the second depth measurement and a tolerance range indicating measurement error in response to a difference between the first depth measurement and the second depth measurement being greater than the predetermined threshold.

5. The method of claim 4 further comprising:
generating, with an output device configured to generate at least one of an optical, acoustic, or haptic alarm, an alarm output in response to computation unit identifying the first depth measurement and the second depth measurement being within the predetermined threshold and the first depth measurement and the second depth measurement both indicating that the depth of the object is less than a predetermined threshold.

6. The method of claim 4, the identifying of the first depth measurement further comprising:
identifying, with the computation unit, the first depth measurement of the object based on the change in the magnetic field produced by the object detected by the magnetic sensor only in response to the change in the magnetic field indicating that the object has a diameter that is within a predetermined detection range.

* * * * *